May 6, 1930.  L. J. WARE  1,756,963
REVERSIBLE SERVING DISH
Filed Jan. 26, 1929
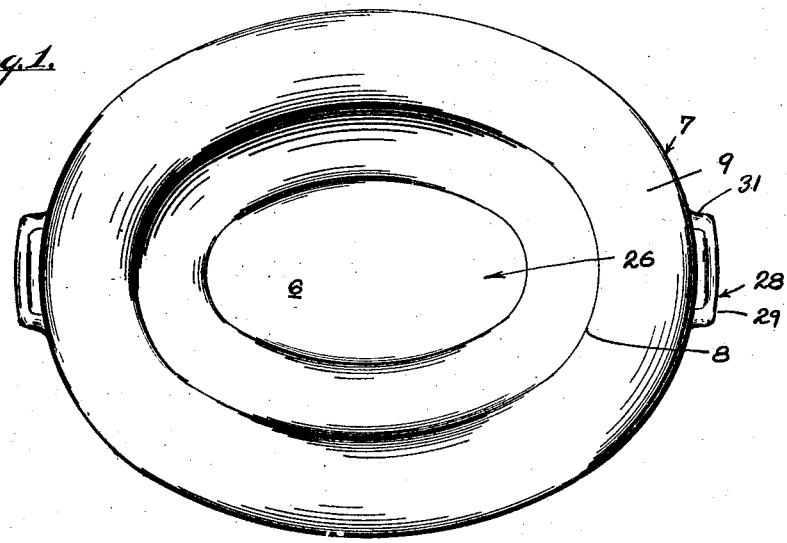
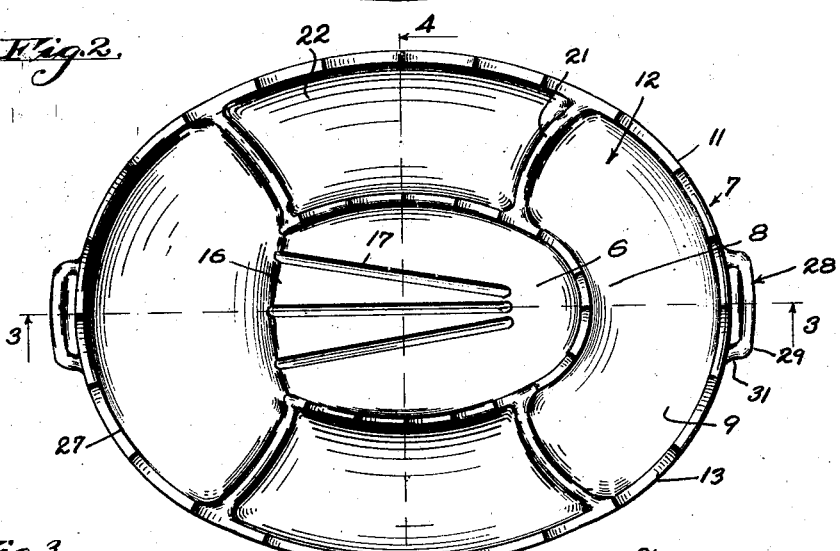
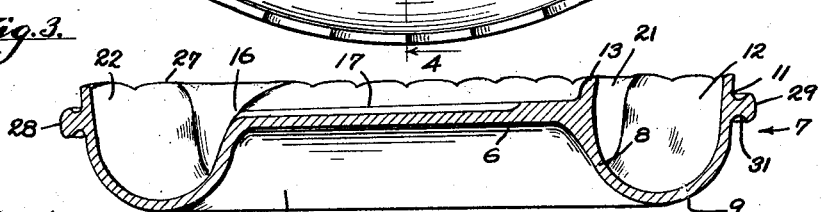
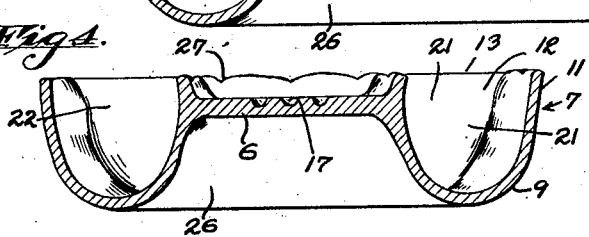
Inventor
L. J. Ware
By Hazard and Miller
Attorneys Patented May 6, 1930

1,756,963

UNITED STATES PATENT OFFICE

LULU J. WARE, OF HOLLYWOOD, CALIFORNIA

REVERSIBLE SERVING DISH

Application filed January 26, 1929. Serial No. 335,253.

This invention relates to serving dishes, and has for an object the provision of an improved type of serving dish adaptable to many distinct uses—for example, it may be used as a serving platter and also as a receptacle for various vegetables, means being provided to keep the different vegetables separated from each other. The dish may also be conveniently used as a flower bowl.

Another object is the provision of a serving dish having an elevated bottom or platter portion having a plurality of receptacles disposed therearound, these receptacles being useful to contain the various vegetables and other foods which are to be served with the meat or other food supported by the platter portion.

A further object is the provision of a dish of the general class described, in which one of the receptacles is intended to contain gravy, this receptacle being in communication with the platter portion so that the drippings of gravy and juice from the meat, will drain into the gravy receptacle.

A still further object is the provision of a dish of the general character described, which, when inverted, presents still another receptacle useful in serving relatively fluid foods such as soups, stews, and the like.

A still further object is the provision of a dish of the general character described, which may be of an ornamental nature, so that it is useful as a flower bowl.

The invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a bottom plan view of a dish embodying the features of my invention.

Fig. 2 is a top plan view.

Fig. 3 is a longitudinal, vertical sectional view taken upon the line 3—3 of Fig. 2, with the direction of view as indicated.

Fig. 4 is a transverse, vertical sectional view taken upon the line 4—4 of Fig. 2, with the direction of view as indicated.

In terms of broad inclusion, the dish of the present invention comprises a raised central portion or platter with a rim disposed therearound, this rim extending both above and below the central portion. The upper surface of the rim is hollow to provide a depression extending around the central portion; and the under surface of the bottom is also hollow to provide a depression encircled by the rim when the dish is inverted.

Specifically describing the invention in its most practical embodiment of which I am at present aware, the dish comprises a raised central, or platter, portion 6, and a rim 7 formed as a flange extending downwards as at 8, from the periphery of the bottom 6, and curving outwards and upwards as at 9, to present a vertical, outermost portion 11 defining a depression 12 encircling the central portion 6. The rim 7 also includes an upstanding bead 13 extending around the periphery of the bottom 6, with the exception of a portion 16 of the periphery where the bead 13 terminates to permit the bottom 6 to drain into the depression 12. To facilitate such drainage, preferably a plurality of grooves 17 are formed in the bottom 6; and the bottom and/or the grooves 17 slope toward the portion 16 where no bead 13 is formed.

The depression 12 is divided by a plurality of webs 21, into compartments or receptacles 22. Preferably two of the partitions 21 define the portion 16 of the periphery of the bottom 6, so that that portion of the receptacle 22 included therebetween may conveniently be used for gravy, and into which any drippings of gravy and meat juices from the platter portion 6, will drain.

The under side of the bottom 6 is hollow, presenting a recess 26. Furthermore, the outermost edge 11 of the flange 7, extends beyond the plane of the bottom 6 so that when inverted, it will serve as a support for the entire dish. In this position, the recess 26 serves as a depression for the reception of any desired commodity such as relatively fluid foods. Also, the inverted dish may be employed as a flower bowl, in which event a suitable frog may be disposed within the depression 26 to support flowers and water therearound. Preferably, the outermost edge 11 of the flange 7, the bead 13, and all of the webs 21, are of the same height, so that when inverted, the dish is provided with a suitably stable support.

It is apparent that the dish of the present invention may be composed of any suitable material such as glass, porcelain, or silver. Furthermore, the attractive appearance of the article may be enhanced by providing a plurality of scallops 27 in the outermost edge 11 of the flange in the bead 13 and in the top edges of the webs 21. In fact, any desired decorations may be formed on the dish, such as engraving or etching. A handle 28 is provided upon preferably each end of the dish to facilitate raising the dish from a supporting surface. Such raising would be difficult when the dish is inverted, if no other provision were made, because when in this position the dish does not present any surface other than these handles which may conveniently be grasped. Preferably each of these handles is in the form of an elongated head 29 connected to the body of the dish, by a neck 31 which is thinner than the head 29, so that a fingerhold is presented upon the under side of the handle regardless of which side of the dish is uppermost.

It is to be understood that the details of the invention as herein disclosed, are subject to alteration within the spirit or scope of the appended claims.

I claim:

1. A dish comprising a bottom, a flange extending downwards from the periphery thereof to support the bottom in elevated position, the under side of said bottom being hollow, said flange curving outwards and upwards to define a depression encircling the bottom, and the outermost edge of said flange extending beyond the plane of said bottom to support the dish when inverted, webs extending across said depression dividing it into a plurality of receptacles, and a bead extending upwards from said bottom adjacent the edge thereof and separating the bottom from certain of said receptacles, said bead terminating between two adjacent webs to permit said bottom to drain into the receptacle therebetween, and said bottom having grooves therein leading into the drain receptacle.

2. A dish comprising a bottom, a flange extending downwards from the periphery thereof to support the bottom in elevated position, said flange curving outwards and upwards to define a depression encircling the bottom, webs extending across said depression dividing it into a plurality of receptacles, and a bead extending upwards from said bottom adjacent the edge thereof and separating the bottom from certain of said receptacles, said bead terminating between two adjacent webs to permit said bottom to drain into the receptacle therebetween, and said bottom sloping downwards toward the drain receptacle and having grooves therein leading into said drain receptacle.

In testimony whereof I have signed my name to this specification.

LULU J. WARE.